Jan. 5, 1932. K. SOHLER 1,840,263

PRESS FOR MOIST MATERIAL

Filed Oct. 2, 1929

Inventor
Karl Sohler
By Knight Bros
Attorneys.

Patented Jan. 5, 1932

1,840,263

UNITED STATES PATENT OFFICE

KARL SOHLER, OF BIEDERITZ, NEAR MAGDEBURG, GERMANY, ASSIGNOR TO THE FIRM FRIED. KRUPP GRUSONWERK AKTIENGESELLSCHAFT, OF MAGDEBURG-BUCKAU, GERMANY

PRESS FOR MOIST MATERIAL

Application filed October 2, 1929, Serial No. 396,867, and in Germany May 4, 1929.

The invention refers to presses for moist material and in particular those especially suitable for pressing oil-producing fruits and seeds. These presses have a case or tube-shaped strainer in which the goods are pressed either in batches by means of pistons or uninterruptedly by a worm. At the outlet aperture a final pressing of the material takes place owing to the outlet aperture being narrowed with respect to the strainer section. The narrowing is effected by means of throttling members projecting more or less into the outlet aperture or by means of an adjustable cone having its apex directed towards the strainer.

The present invention relates to the last-mentioned form of construction, in which hitherto the restricted outlet aperture has been formed between the inner surface of the strainer wall or a continuation thereof and the outer surface of the cone. The material travelled toward the base of this cone, the result being that the inner diameter of the roll of material passing through the aperture continually increased in size: the material was thus pulled apart and loosened which was detrimental to the solidity of the pressed-out cake and also to the final pressing-out process. Furthermore, the friction increased with the increase of the rubbing surface due to the enlargement of the cone and the increased surface speed.

This fault is avoided, according to the invention, by forming the narrowing outlet aperture between the inner surface of a hollow cone decreasing in sectional area in the direction of movement of the material and the outer surface of the press shaft itself, or of the worm boss, or of a bush fitted on the shaft or the like. The working edge or surface co-operating with the inner surface of the hollow cone may be produced by the end of the shaft boss or bush or by an enlargement thereon, which latter may be formed slightly conical or curved in external contour. The regulation of the area of the outlet aperture is effected in known manner by the axial displacement of the hollow cone, the internal surface of which may be strictly conical or curved in the direction of the press axis.

One way of carrying out the invention is shown as an example on the accompanying drawings, in which:—

Figure 1:
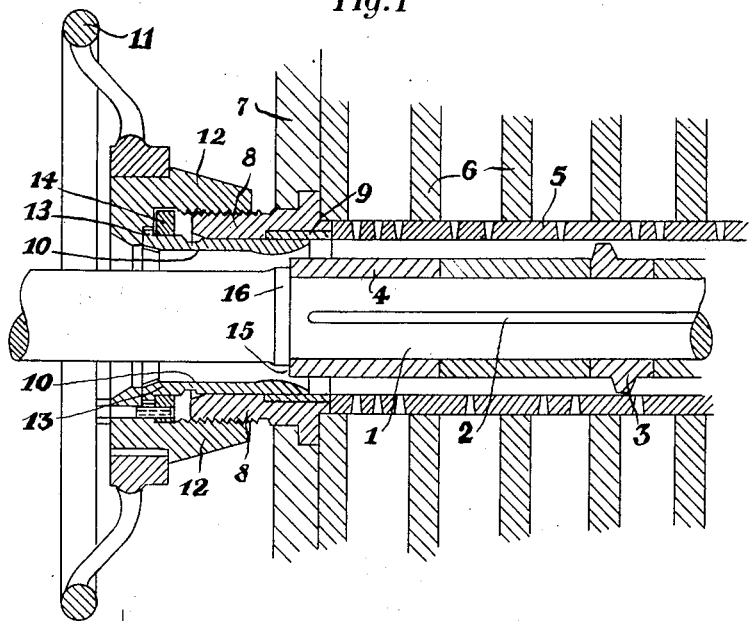
Figure 2:
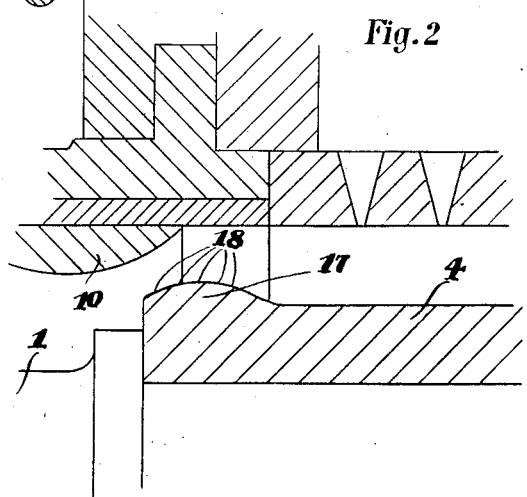

Figure 1 is an axial section of the regulating apparatus for the outlet aperture of the press, and Figure 2 shows another example of the throttling edge at the outlet aperture, as a detail on a larger scale.

On the drawings 1 indicates the worm shaft, on which are fixed by means of keys 2 bushes 3 serving as worm bosses. These bosses are, according to Figure 1, made of the same diameter up to the outlet aperture, but, as shown the worm may cease a little before the outlet aperture and the worm boss be extended by a bush 4. 5 is the strainer with its supports 6 and the press wall at the outlet end is indicated by 7. On this is fixed a projection 8, externally threaded, preferably of the same internal diameter as the strainer wall and provided in proximity to the latter with an interchangeable lining 9. In the projection 8 there slides a hollow cone or sleeve 10, the internal diameter of which increases towards the strainer, the contour of this bore being either strictly conical or curved in the direction of the press axis as shown on the drawings. The hollow cone 10 is displaced by means of a nut 12 provided with a hand-wheel 11 or spokes and adapted to be screwed along the thread of the projection 8. The hollow cone 10 bears at its extension on the nut 12 by means of a flange 13 over which a collar 14 engages in order to carry back the hollow cone 10 when the nut 12 is screwed back. The throttling edge 15 working in combination with the hollow cone is formed, according to Figure 1, by the front end of the bush 4 projecting beyond the shoulder 16 of the worm shaft 1.

It will be seen from Figure 2 of the drawings that, instead of being entirely cylindrical, the bush 4 may have a conical or curved enlargement 17 at the outlet end, thus if desired, presenting a curved throttling surface 18.

What I claim is:—

1. A press for moist material of the type described, a tubular straining wall in said press, a shaft centrally mounted with respect to said straining wall, feeding and pressing members mounted upon said shaft, an outlet for said moist material comprising a bushing mounted at the extremity of said shaft of lesser diameter than that of said straining wall, a sleeve body cooperating with said bushing having a slightly greater internal diameter at the end near the bushing than that at the opposite end therof, and with its external diameter in the plane of said straining wall, a cylindrical projection extending from the press frame, threaded upon its exterior and adapted to guide the sleeve body at its interior, and means cooperating with said projection to adjust the position of said sleeve with respect to said bushing.

2. A press for moist material of the type described, a tubular straining wall in said press, a shaft centrally mounted with respect to said straining wall, feeding and pressing members mounted upon said shaft, an outlet for said moist material comprising a bushing mounted at the extremity of said shaft of lesser diameter than that of said straining wall, a sleeve body cooperating with said bushing having a slightly greater internal diameter at the end near the bushing than that at the opposite end thereof, a cylindrical extension at this latter end, and means comprising a hand wheel associated with said extension to effect the axial adjustment of said sleeve body.

3. A press as claimed in claim 2 wherein the last-named means comprises a hand wheel, and a connection between said hand wheel and said extension capable of actuating the latter in an axial direction only, comprising a flange upon the extremity of said extension disposed in a groove in the hand wheel body.

4. A press for moist material of the type described, a tubular straining wall in said press, a shaft centrally mounted with respect to said straining wall, feeding and pressing members mounted upon said shaft, an outlet for said moist material comprising a bushing of a lesser diameter than that of the straining wall and with a curved enlargement at its outermost extremity mounted on the end of said shaft, a sleeve body with a tapered interior surface cooperating with the extremity of said bushing, and means to adjust the relative position between said bushing and said sleeve body.

5. A press as claimed in claim 4 where the sleeve body is curved convexly at its point of cooperation with the bushing.

KARL SOHLER.